(12) United States Patent
Estock et al.

(10) Patent No.: US 8,407,173 B2
(45) Date of Patent: Mar. 26, 2013

(54) SYSTEM AND METHOD FOR COMPARING SYSTEM FEATURES

(75) Inventors: Jamie L. Estock, Washington, DC (US); Robert K. McCormack, Somerville, MA (US); Emily K M Stelzer, Rockville, MD (US); Kathryn Engel, Ijamsville, MD (US); Amy Alexander Horrey, Maynard, MA (US)

(73) Assignee: Aptima, Inc., Woburn, MA (US)

( * ) Notice: Subject to any disclaimer, the term of this patent is extended or adjusted under 35 U.S.C. 154(b) by 1179 days.

(21) Appl. No.: 12/244,798

(22) Filed: Oct. 3, 2008

(65) Prior Publication Data

US 2009/0192964 A1 Jul. 30, 2009

Related U.S. Application Data

(60) Provisional application No. 61/024,687, filed on Jan. 30, 2008.

(51) Int. Cl.
  G06F 17/00 (2006.01)
  G06N 5/02 (2006.01)
(52) U.S. Cl. ............... 706/46; 706/12; 706/19
(58) Field of Classification Search ............... 706/46
  See application file for complete search history.

(56) References Cited

U.S. PATENT DOCUMENTS

| | | | |
|---|---|---|---|
| 6,622,134 B1* | 9/2003 | Sorkin | 706/20 |
| 6,642,940 B1* | 11/2003 | Dakss et al. | 715/723 |
| 7,072,709 B2* | 7/2006 | Xue | 600/509 |
| 7,080,071 B2* | 7/2006 | Henrion et al. | 707/713 |
| 7,149,679 B2 | 12/2006 | Woodring | |
| 7,858,869 B2* | 12/2010 | Goto et al. | 84/616 |
| 8,068,900 B2* | 11/2011 | Xue | 600/509 |
| 8,185,481 B2* | 5/2012 | Long et al. | 706/12 |
| 2005/0060155 A1* | 3/2005 | Chu et al. | 704/269 |
| 2005/0216426 A1* | 9/2005 | Weston et al. | 706/12 |
| 2005/0216879 A1* | 9/2005 | Ruhe | 717/101 |
| 2006/0122834 A1* | 6/2006 | Bennett | 704/256 |

OTHER PUBLICATIONS

Elizabeth L. Gilligan, B. Leon Elder, and Paul J. Sticha, Optimization of Simulation-Based Training Systems: User's Guide, ARI Research Note 91-04, Oct. 1990, United States Army Research Institute for the Behavioral and Social Sciences, Alexandria VA.

Ruth P. Willis, Probin Guha and David R. Hunter, The Optimization of Simulation-Based Training Systems: Model Data Collection and Utilization, ARI Research Note 91-13, Dec. 1990, United States Army Research Institute for the Behavioral and Social Sciences, Alexandria VA.

Paul J. Sticha, H. Ric Blacksten, Dennis M. Buede, Michael J. Singer, Elizabeth L. Gilligan, Randall J. Mumaw, and John E. Morrison, Optimization of Simulation-Based Training Systems: Model Description, Implementation, and Evaluation, Technical Report 896, Jun. 1990, United States Army Research Institute for the Behavioral and Social Sciences, Alexandria VA.

(Continued)

Primary Examiner — Michael B Holmes
(74) Attorney, Agent, or Firm — John J Brooks, III

(57) ABSTRACT

Embodiments of the disclosed systems and methods establish quantitative relationships between system features and system objectives. In some embodiments, the features have a plurality of feature values related to the objective and the methods comprise analyzing a mathematical functional relationship between the plurality of feature values and the objective to create a plurality of objective values reflecting the ability of the feature values to satisfy the objective, selecting a feature value and analyzing the relationship to create an objective value; and generating an objective measure reflecting the objective value. In some embodiments, the mathematical function comprises a polynomial interpolation. In some embodiments, the features are a fidelity dimension and the feature values are values of fidelity in a processor based aircraft simulator.

14 Claims, 7 Drawing Sheets

OTHER PUBLICATIONS

Michael A. Campanion, IST-TR-90-08, ASTAR Operational Evaluation Final Report, vol. II: Study Reports, Apr. 13, 1990, Institute for Simulation and Training, 12424 Research Parkway, Suite 300, Orlando FL.

Michael A. Campanion, IST-TR-90-08: ASTAR (Automated Simulator Test and Assessment Routine) Operational Evaluation: Conclusions and Recommendations, Apr. 13, 1990, Institute for Simulation and Training, 12424 Research Parkway, Suite 300, Orlando FL.

Michael A. Campanion, IST-TR-90-08: ASTAR (Automated Simulator Test and Assessment Routine) Operational Evaluation Report, Apr. 13, 1990, Institute for Simulation and Training, 12424 Research Parkway, Suite 300, Orlando FL.

Michael A. Campanion, IST-TR-90-08: ASTAR Operational Evaluation, Final Report, vol. I: Project Description, Apr. 13, 1990, Institute for Simulation and Training, 12424 Research Parkway, Suite 300, Orlando FL.

Michael A. Campanion, IST-TR-90-08: ASTAR Operational Evaluation, Final Report, vol. II: Test Reports, Apr. 13, 1990, Institute for Simulation and Training, 12424 Research Parkway, Suite 300, Orlando FL.

Michael A. Campanion, IST-TR-90-08: ASTAR Operational Evaluation, Final Report, vol. III: Functional Description, Apr. 13, 1990, Institute for Simulation and Training, 12424 Research Parkway, Suite 300, Orlando FL.

Michael A. Campanion, IST-TR-90-08: Attachment, ASTAR Training Slides, Institute for Simulation and Training, 12424 Research Parkway, Suite 300, Orlando FL.

Michael J. Singer, The Optimization of Simulation-Based Training Systems: A Review of Evaluations and Validation of Rule Bases, Research Report 1653, Nov. 1993, U.S. Army Research Institute November, Orlando, FL.

Estock, J.L., Alexander, A.L., Gildea, K.M., Nash, M. & Blueggel, B. (2006). A model-based approach to simulator fidelity and training effectiveness. Proceedings of the 28th Annual Interservice/Industry Training, Simulation and Education Conference, Orlando, FL, Dec. 2006.

Estock, J.L., Alexander, A.L., Stelzer, E.M. & Baughman, K. (2007). Impact of visual scene field of view on F-16 pilot performance. Paper presented at the 51st Annual Meeting of the Human Factors and Ergonomic Society, Baltimore, MD, Oct. 4, 2007.

Estock, J.L., McCormack, R., Bennett, W. & Patrey, J. (2008). A Model-based Tool to Quantify Simulation Fidelity: Preliminary Results, Ongoing Development, and Future Applications. Paper presented at the American Institute of Aeronautics and Astronautics Modeling and Simulation Technologies Conference and Exhibit, Honolulu, HI, Aug. 2008.

Michael A. Campanion, Automated Simulator Test and Assessment Routine (ASTAR) Operational Evaluation Report, Oct. 31, 1991, Institute for Simulation and Training, 12424 Research Parkway, Suite 300, Orlando FL.

* cited by examiner

| 510 | Skill Requirements | | | Knowledge Requirements | | | |
|---|---|---|---|---|---|---|---|
| | Interprets sensor output | Listens | Radar mechanization | | Engage criteria | Formulation | Threat capabilities |
| Communication | 6 | 9 | 4 | | 5 | 3 | 5 |
| Aircraft Alerting Sounds | 6 | 5 | 0 | | 2 | 0 | 4 |
| Aircraft Operating Status Sounds | 3 | 3 | 0 | | 0 | 1 | 0 |
| Content and Operation of Cockpit Controls & Displays | 9 | 2 | 8 | | 7 | 3 | 2 |
| Shape and Layout of Cockpit Controls & Displays | 6 | 2 | 9 | | 3 | 3 | 1 |
| Disturbance Cues | 1 | 1 | 0 | | 0 | 1 | 5 |
| Maneuvering Cues | 2 | 0 | 0 | | 0 | 1 | 5 |
| Platform Motion | 2 | 0 | 0 | | 0 | 0 | 0 |
| Visual Scene Display Object to Background Contrast | 4 | 0 | 2 | | 3 | 4 | 3 |
| Visual Scene Display Resolution | 5 | 0 | 2 | | 4 | 5 | 5 |
| Visual Scene Display Field of View | 5 | 0 | 3 | | 5 | 7 | 5 |

FIG. 5

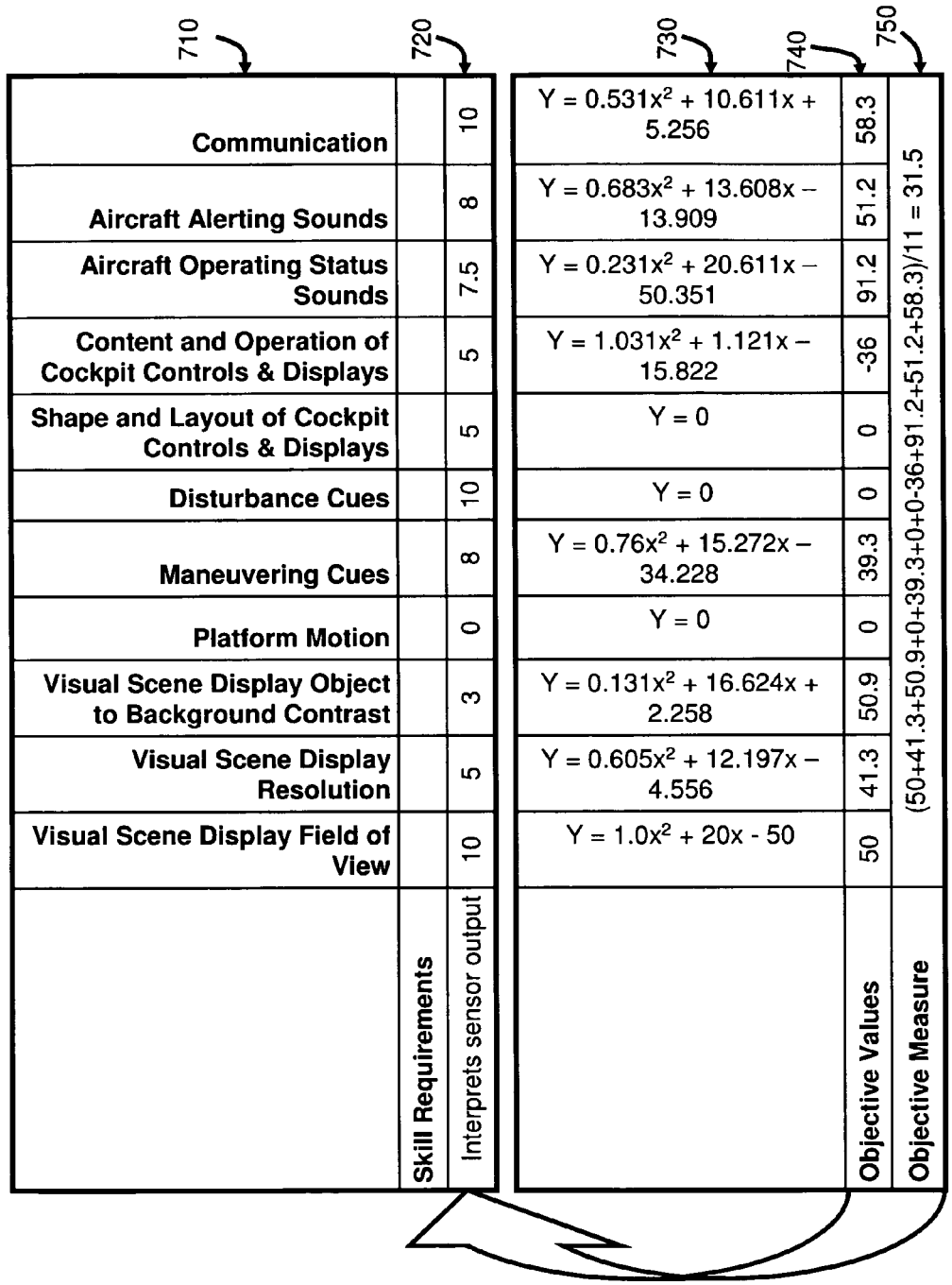

FIG. 7

| 710 | 720 | 730 | 740 | 750 |
|---|---|---|---|---|
| Communication | 10 | Y = 0.531x² + 10.611x + 5.256 | 58.3 | (50+41.3+50.9+0+39.3+0+0-36+91.2+51.2+58.3)/11 = 31.5 |
| Aircraft Alerting Sounds | 8 | Y = 0.683x² + 13.608x − 13.909 | 51.2 | |
| Aircraft Operating Status Sounds | 7.5 | Y = 0.231x² + 20.611x − 50.351 | 91.2 | |
| Content and Operation of Cockpit Controls & Displays | 5 | Y = 1.031x² + 1.121x − 15.822 | -36 | |
| Shape and Layout of Cockpit Controls & Displays | 5 | Y = 0 | 0 | |
| Disturbance Cues | 10 | Y = 0 | 0 | |
| Maneuvering Cues | 8 | Y = 0.76x² + 15.272x − 34.228 | 39.3 | |
| Platform Motion | 0 | Y = 0 | 0 | |
| Visual Scene Display Object to Background Contrast | 3 | Y = 0.131x² + 16.624x + 2.258 | 50.9 | |
| Visual Scene Display Resolution | 5 | Y = 0.605x² + 12.197x − 4.556 | 41.3 | |
| Visual Scene Display Field of View | 10 | Y = 1.0x² + 20x - 50 | 50 | |
| | Skill Requirements / Interprets sensor output | | Objective Values | Objective Measure | ial Patent
SYSTEM AND METHOD FOR COMPARING SYSTEM FEATURES

CROSS-REFERENCE TO RELATED APPLICATIONS

This invention claims benefit of U.S. Provisional Patent Application No. 61024687, entitled "System and Method for Determining Simulator Fidelity" filed on Jan. 30, 2008 which is herein incorporated by reference in its entirety.

STATEMENT REGARDING FEDERALLY SPONSORED RESEARCH OR DEVELOPMENT

This invention was made with Government support under Contract #FA8650-05-C-6649 awarded by U.S. Air Force. The Government has certain rights in the invention.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

The subject invention generally relates to decision making methods that can accurately reflect the effect of features on system objectives. More particularly, embodiments of the subject invention relate to systems and methods to determine simulator fidelity to increase the effectiveness, as an objective, of the simulation.

2. Brief Description of the Related Art

In the field of simulator systems, there is little guidance and no standard method for determining the appropriate level of fidelity to achieve the objectives of the system. This is particularly true for training simulators. As a result, it is difficult to identify which objectives can be trained in lower-fidelity simulators, higher-fidelity simulators, and which require training in the operational environment/system (e.g., aircraft).

In military environments, effective training develops capabilities that can mean the difference between life and death for soldiers, sailors and airmen. The same significance of capability development can be said for doctors, first responders and other health and safety personnel. The tremendous expense and inherent dangers of real-world training forces an increased use of simulators in training. For example, to reduce the dependence on the aircraft as the primary training media the Air Force advocates the use of realistic simulators as substitute training environments. Predictably, an approach of training in high-fidelity simulators can be prohibitively expensive to implement on a large scale.

There are numerous ways to simulate various aspects of flight without high-fidelity simulators. Although the evidence indicates that full-fidelity simulators provide a high degree of transfer to situations such as flight training, some evidence also surprisingly indicates that lower fidelity simulators can provide benefits without the added expense and complexity. The civilian simulator market contains relatively inexpensive PC-based systems for training procedures and operations in Instrument Flight Rules (IFR) conditions. A plethora of force-cueing devices can augment the lower fidelity simulators. However, the effects of force-cueing devices on perceptual fidelity is a heavily debated topic. Furthermore, the available information is documented in disparate and fragmented literature. The tradeoffs between differing levels of fidelity and the effect on mission performance are still being explored and modeled to better understand the relationship between simulator fidelity and mission performance.

Existing literature on fidelity is fragmented and disparate making it difficult to use in a consolidated and constructive way for decision-support.

Fidelity requirements defined by end-users are important to ensure that end-users buy-in to the training system (i.e., believe it will be an effective system for training). However, preliminary findings from some research reveals a discrepancy between end-user assessment of the effectiveness of simulators and the objective performance outcomes. Specifically, jet pilots in studies state that a large Field of View (FOV) was necessary to train formation flight. However, a comparison between pilots who flew in simulator with 108 degrees FOV and 360 degrees FOV revealed no difference in performance related to formation flight.

Given these surprising revelations, it is difficult to predict the effect of multiple simulator features on the effectiveness of a simulator. Given the interaction of features in simulator effectiveness, it is difficult to predict the most effective combination of features that maximize the effectiveness of the simulator. More difficult yet is to account for complex constraints on the training environment such as costs or constraints on the trainee or the training context.

BRIEF SUMMARY OF THE INVENTION

Embodiments of the disclosed systems and methods establish quantitative and accurate predictive relationships between system features and system objectives. In one embodiment, the systems and methods are particularly suitable to establish the predictive relationships between fidelity and training objectives. These systems and methods combine fidelity values defined by end-users, existing theory and research, and objective performance data from experiments. The predictive relationships defined through these methods feed a model-based decision support tool that helps predict the impact of fidelity on training effectiveness.

One embodiment of the invention comprises a computer implemented method for measuring an objective of a system, the method comprising the steps of receiving an objective, receiving a feature having a plurality of feature values related to the objective, analyzing a relationship between the plurality of feature values and the objective to create a plurality of objective values reflecting the ability of the feature values to satisfy the objective, the relationship between the plurality of feature values and the objective comprises a mathematical function of the plurality of feature values to the plurality of objective values, selecting a feature value and analyzing the relationship to create an objective value and generating an objective measure reflecting the objective value.

In another embodiment of the invention, the step of analyzing the relationship between the plurality of feature values and the objective comprises analyzing a polynomial interpolation of the plurality of feature values to the objective values.

Another embodiment of the invention further comprises receiving the relationship of at least one pairing of the plurality of feature values and the plurality of objective values to create the polynomial interpolation prior to analyzing the polynomial interpolation.

One embodiment of the invention comprises a computer implemented method for comparing features in a system, said method comprising the steps of receiving a system goal, receiving a plurality of objectives each having a weighted value to the system goal, receiving a plurality of features each having a plurality of feature values related to the objective, analyzing a relationship between the plurality of feature values and the objective to create a plurality of objective values reflecting the ability of the feature values for each feature to satisfy the objective, iteratively selecting a feature value for each of the plurality of features to create a plurality of sets of feature values, analyzing the relationship of each of the sets of feature values to create a plurality of objective values for each set of feature values, generating a plurality of objective measures based on the plurality of objective values for each set of feature values, generating a plurality of system goal measures based on the weighted value of each of the plurality of objective measures and comparing the plurality of system goal measures.

In another embodiment of the invention, the step of analyzing the relationship between the plurality of feature values and the objective comprises analyzing a polynomial interpolation of the plurality of feature values to the objective reflecting the ability of the feature value to satisfy the objective.

Another embodiment of the invention further comprises generating a system goal measure optimum by selecting the set of feature values that result in the system goal measure closest to the system goal.

One embodiment of the invention comprises a method for relating the features of a system to objectives of a system, said method comprising: identifying at least one feature, identifying at least one objective, defining a functional relationship that relates the at least one feature to at least one objective to create at least one objective value and defining predictive relationships that relates the at least one objective value to create an objective measure.

In another embodiment of the invention, each feature comprises at least one feature value, each objective comprises at least one objective value and each objective value is related to a feature value, the functional relationship is a computer implemented polynomial interpolation of at least one objective value and feature value and the predictive relationship is a computer implemented average of objective values.

The computer based embodiments disclosed permit comprehensive and accurate predictions of the impact of simulator fidelity on training effectiveness. These computer based embodiments allow for accurate predictions that can deal with complex constraints of the training environment (e.g., organizational, trainee, and training context), thus providing guidance to training designers and acquisition professionals that considers the multifaceted training environment. Computer based embodiments allow for consideration of interactions between multiple features, such as the interactions between fidelity dimensions (e.g. visual, auditory, motion) and their impact on training effectiveness. It is helpful to understand which fidelity dimensions should be supported for training a given task and how multi-dimension components should be integrated into the virtual environment to deliver the most effective training. Computer based embodiments allow for a priori examination of effects on training resulting from integrating various dimensions at differing levels of fidelity.

Additionally, model-based tools, and in particular computer based tools, allow for the integration of a training effectiveness model with a cost model. The inclusion of the cost model allows the user to optimize the simulator to produce the desired training at the lowest cost. A model-based embodiment can provide a comprehensive and accurate prediction of the impact of simulator fidelity on training effectiveness to assist acquisition decisions.

BRIEF DESCRIPTION OF THE SEVERAL VIEWS OF THE DRAWING

FIG. 5. Shows an example of one embodiment of a matrix of fidelity dimensions and objectives showing a relationship matrix of fidelity dimensions and objectives.

FIG. 7. Shows the results of one embodiment of the functions and predictive algorithms to create an objective measure.

DETAILED DESCRIPTION OF THE INVENTION

Although the present system and methods will be described in terms of a preferred embodiment, it is not intended that the invention be limited to this embodiment. Generally, embodiments of the disclosed system and methods provide an ability to relate a set of features and objectives of a system to create a means to evaluate how those features impact the objectives and how the features and objectives impact the system level objectives. As will be discussed throughout this description, one particular embodiment of this invention can work with a training simulation system and the features can comprise fidelity dimensions of the simulator and the objectives can comprise objectives of predicting the effectiveness of that set of features to train a particular subject. However, it is understood that the systems and methods can be applied to a wide variety of systems or processes. For example and not for limitation, embodiments of the system can comprise a computer based game, features can comprise different rules to the game and the objectives can range from length of the game, level of player engagement in the game or other desired results of the game. Embodiments of the system can also apply to trauma center processes where the system comprises that department of a hospital, features comprise different equipment or skill sets in that department and objectives can comprise objectives such as response time, wait time, type of services offered, cost of services rendered and other objectives of a trauma center. Similar embodiments can include, but not be limited to those that would relate product features to benefits, investment products to risk/return or organizational structure to capabilities. Other modifications of these systems and methods will be apparent to those skilled in the art and are anticipated by this disclosure.

For illustration purposes, details of one embodiment of the system and methods will be described in detail below. This embodiment comprises a method of analyzing the fidelity dimensions of a training simulator to predict the effectiveness of that simulator in training a student. In that embodiment, the features comprise fidelity dimensions, the objectives comprise training a subject and the goal of the system is to effectively train one or more subjects.

The System:

The following discussion provides a brief, general description of a suitable computing environment in which one embodiment of the present invention may be implemented.

The invention will often be practiced on a single computing device, but can also be implemented on a client computing device and/or a server or other remote computing device connected by a communication network. In this embodiment, the system comprises a computer based system capable of enabling a user to create or modify the features for a system and evaluate the ability of those features to meet one or more objectives.

Figure 1:
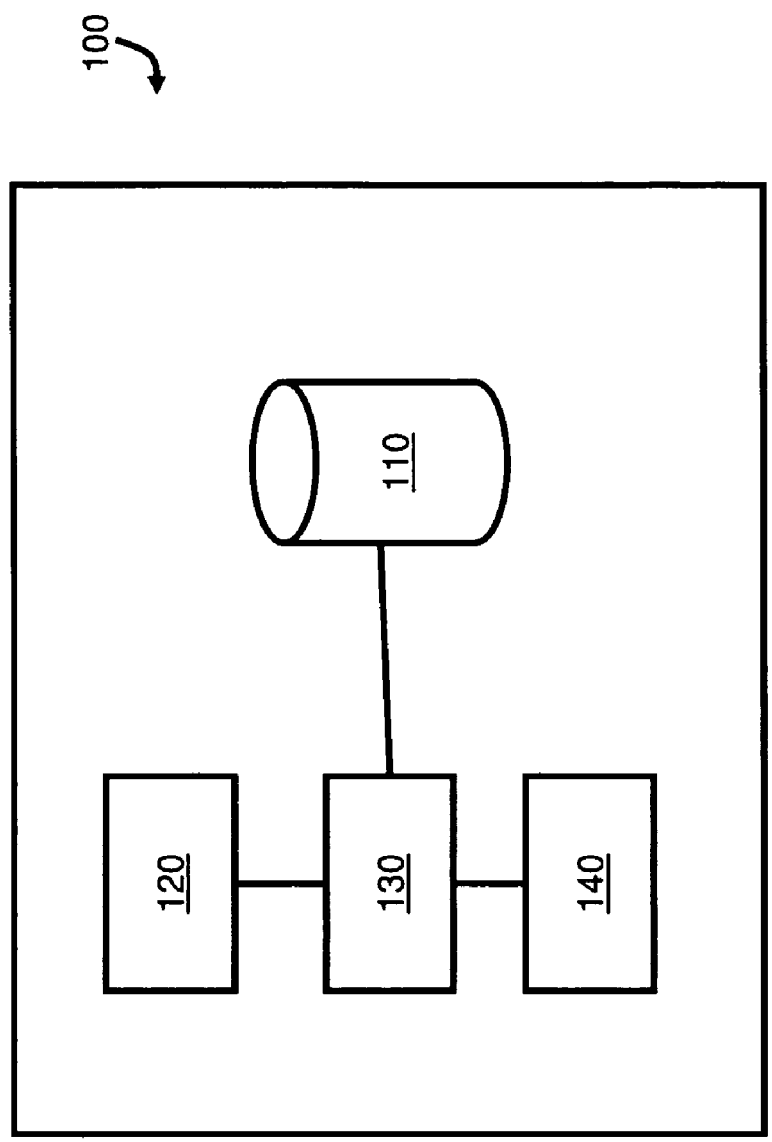
FIG. 1. Illustrates a functional diagram of a suitable computing device for one embodiment the invention.

As shown in FIG. 1, the computer based system 100 comprising: a storage and retrieval resource 110 such as memory or a hard disk drive on which are stored machine instructions or computer executable code that define a plurality of functions; a computer display screen and/or a printer 120 to produce output from the computer; a user input device 130 such as a keyboard in combination with a pointing device such as a mouse to input data into the computer; at least one processor 140 that is coupled to the memory, the display, and the user input device; and said processor executing the machine instructions to carry out the plurality of functions.

An example of a suitable computing environment includes but is not limited to a computer with Windows NT based (NT, 2000, XP) operating system, a Pentium 4 (2.0 Ghz or equivalent) processor, 200 MB available hard drive memory and machine instructions stored as computer executable code including Java JRE version 6 update 2 for windows XP and Microsoft .NET v2.0 or later framework.

In the preferred embodiment of this system, the processor accepts user input and executes the machine instructions to carry out the plurality of functions, including the methods described herein.

Those skilled in the art will appreciate that this invention might also be practiced with other computer system configurations, such as a client device for executing personal productivity tools, including hand-held devices, pocket personal computing devices, other microprocessor-based or programmable consumer electronic devices, multiprocessor systems, network PCs, minicomputers, mainframe computers, and the like. Furthermore, the present invention can also be practiced in distributed computing environments, where tasks are performed by remote processing devices that are linked through a communications network. In a distributed computing environment, machine instructions may be located in both local and remote memory storage devices.

Figure 2:
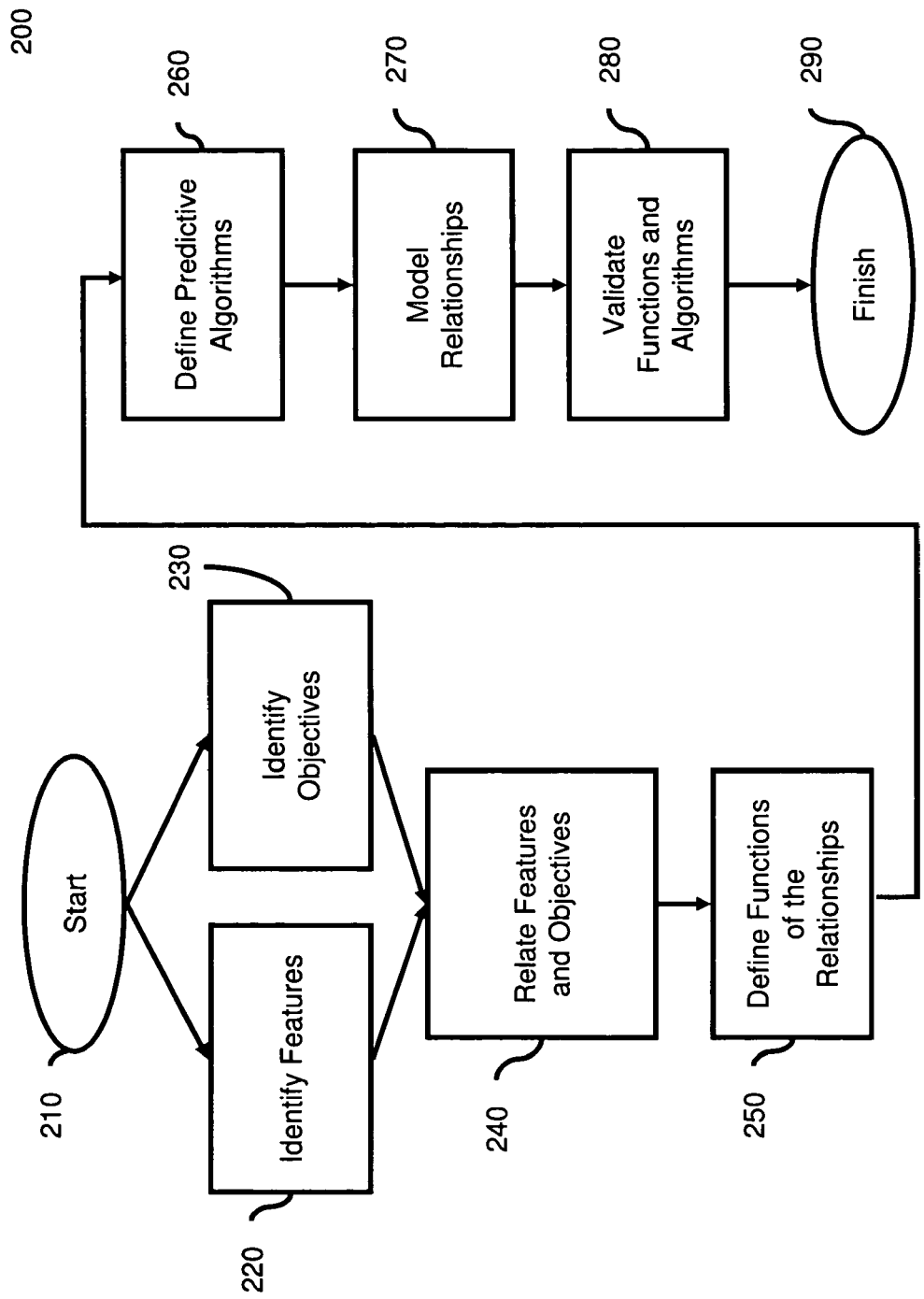
FIG. 2. Shows a process diagram of one embodiment of the steps of the invention.

The Method:

FIG. 2 illustrates the step of one embodiment of the disclosed method for analyzing the feature and objective levels for a system. This embodiment can provide a quantitative and predictive relationship between the system features and the objective of the system.

For embodiments such as training simulators, the method provides a quantitative, predictive relationship between simulator fidelity and training effectiveness. Embodiments of the methods can create decision-support tools that can assist users in, (a) determining what skills can be trained in existing simulators, (b) prioritizing technology enhancements to improve the training effectiveness of existing simulators, (d) determining what simulator to develop or acquire, and (e) developing a strategy for employing a suite of high- and low-fidelity simulators that logically support one another to meet the training objectives.

One embodiment of this method for a training simulator comprises the seven steps of: (1) identifying the relevant simulator fidelity dimensions, (2) identifying the required training objective to be trained in the specific domain, (3) determining whether a relationship exists between the fidelity dimensions and the training objectives, (4) developing mathematical functions that define the relationships between fidelity dimensions and the training objectives to create training objective values reflecting the ability of a fidelity dimension value to meet the training objective, (5) developing algorithms that combine these functions to create predict training effectiveness prediction measures, (6) using the functions and algorithms from steps 5 and 6, select fidelity dimension values to create training effectiveness prediction measures, and (7) empirically validating and improving the functions and algorithms. Below is a detailed description of each step.

The mathematical functions and effectiveness prediction algorithms can be included in a computer based model that can iterate through fidelity dimension and objective values to create multiple effectiveness prediction measures. This computer based model can be capable of accepting user input to select multiple fidelity dimensions, objective values or effective prediction measures to allow a user to compare the effect of one value on another value and the effect on other system measures.

For description purposes and not for limitation, the steps below will be described as it is applied to determine the level of fidelity of features required for effective air-to-air combat training in jet simulators.

Step 1: Identify Features.

Referring to FIG. 2, after the process starts at 210, the first step 220 is to identify the features that are relevant to the particular domain of interest or objective.

In an embodiment of a training simulator, the features comprise fidelity dimension that are identifies by researchers that conduct a review of research articles on the cognitive and perceptual elements related to simulator fidelity to identify the dimensions and levels of simulator fidelity relevant to the objective domain. In addition, subject matter experts (SMEs) from the specific domain are interviewed to identify which fidelity dimensions they are interested in and believe to be most relevant to their domain.

Simulator fidelity dimensions are defined as the degree to which a training simulator accurately reproduces the actual environment along various continuums. One example of the fidelity dimensions in this embodiment includes physical fidelity. Physical fidelity is the degree to which the physical simulation resembles the operational environment. Researchers have further divided physical fidelity into distinct dimensions such as visual scene simulation, sound effects and communication simulation, whole body motion, and handling qualities and control loading. Furthermore, several researchers have identified specific subcategories within these fidelity dimensions. For example, motion cues have been separated into maneuver cues and disturbance cues. Maneuver cues result from flight control inputs by the pilots, such as G-cues. Disturbance cues result from changes in the environment or aircraft state outside of the control loop, such as turbulence or loss of an engine.

Other methods of identifying dimensions of fidelity include, but are not limited to using actual fidelity data, reviewing other literature or making initial estimates to be refined by actual experimentation.

Step 2: Identify Objectives.

The second step 230 in a preferred embodiment of this method is to identify the relevant objectives for the system.

In an embodiment of a training simulator, the objectives comprise relevant training objectives for a specific domain. If the training objectives are not pre-defined, training objectives are identified through a job analysis or any other way of categorizing the knowledge and skills desired to be increased by training.

Relevant training objectives are defined as the competencies, knowledge, and/or skills necessary for success in an operational environment. Examples of these include the ability to control intercept geometry and maintain a briefed formation in air-to-air combat.

It is understood that other embodiments of the systems and methods of this invention can be utilized to affect other objectives, besides training objectives, that are influenced by the fidelity of the system. For gaming systems, it may be desirable to have users on the system for a longer period of time or have them perform certain actions rather than other actions. One embodiment of this system and method can identify these relevant objectives to be modeled and related to simulator or game system fidelity. Other objectives can include, but are not limited to, performance objectives, testing objectives, participation objectives, cost objectives or time constraints.

It is understood that step 1 220 and step 2 230 can be performed in any order prior to step 3.

Step 3: Relate Features and Objectives.

The third step 240 in the preferred embodiment of this method is to identify the relationship that exists between the features established in Step 1 and the objectives identified in step 2.

In order to accomplish this for an embodiment of a training simulator, questionnaires were developed and distributed to domain SMEs to identify if they would expect performance on a particular training objective to be affected by changes in fidelity within each dimension. A focused review of the literature was also conducted to find research and theories to support the relationships.

The term "relating" as used in this step is defined as documenting that a relationship exists between the training objective and the fidelity dimension.

The output of steps 1-3 is a matrix that theoretically identifies the fidelity dimensions that are likely to affect specific learning objectives according to SME opinion and existing theory and research. Specifically, the framework displays which fidelity dimensions are likely to have an impact on each training outcome (e.g. the visual scene field of view affects trainees' ability to learn the skill of maintaining a briefed formation) and lists the research and theories that support that relationship. The theoretical framework also identifies the direction of the relationship. For example, pilot SMEs identified a 'positive relationship' between the cockpit controls and displays fidelity and the air-to-air skill of "radar mechanization'. The F-16 SMEs explained that training pilots to use their radar to locate and track relevant targets effectively in air-to-air combat (i.e. the air-to-air skill of "radar mechanization") would require high-fidelity cockpit controls and displays in the simulator. The words "Positive" and "Negative" and the "V" symbol can be used in the theoretical framework to represent positive relationships between a given fidelity dimension and training objective, negative relationships, and those instances in which the direction of the relationship was not indicated, respectively. Is it understood that other methods of identifying the relationship between the training objectives and the fidelity dimensions can be used. These methods can include, but are not limited to, color coding, letters or any combination of these methods.

As shown in FIG. 5, in this embodiment the matrix of fidelity dimensions 510 to objectives 520 includes a numerical representation 530 of "votes" that were given by a number of experts concerning whether a fidelity dimension had a relationship with an objective. For example, the "Visual Scene Display Field of View" had 5 votes that it had a relationship with a training objective of effectively training a student to "Interpret Sensor Output". With this embodiment, a minimum number of votes at a matrix matching of fidelity and objectives can be used as a cut-off to define whether a relationship exists. Any matrix matching that is below that threshold can be determined to not have a relationship.

Although helpful, this step is not always required. This step can help minimize the number of fidelity dimensions and objective matrix matchings that need to be analyzed in the following steps. It is understood that embodiments of this step may include assumptions that all fidelity and objective matrix have the possibility of affecting the training output. In these embodiments, if values are provided for fidelity dimensions and objectives (as described in step 4), these matrix matchings will be calculated according to the subsequent steps and all matrix matchings without values can be given a "null" value that neither is a positive or a negative bearing on the following steps. A curve with no slope and a y value of 0 will typically provide a null value in the following steps.

Step 4: Define Mathematical Functions for the Relationship Between Features and Objectives.

The fourth step 250 in a preferred embodiment of this method is to translate details of the relationships identified in step 3 into mathematical functions that describe these relationships. Mathematical functions define the relationships between training objectives and the fidelity dimensions. In one embodiment, we represent the relationships in the model as polynomial functions of the form $a_0 x^n + a_1 x^{n-1} + \ldots + a_{n-2} x^2 + a_{n-1} x + a_n$. We chose this format for several reasons:

any arbitrary continuous relationship on an interval can be accurately estimated by a polynomial of sufficient degree.

given a set of data or theoretical function it is relatively simple to fit a polynomial through regression or interpolation.

operations on polynomials (such as evaluating at a point or finding the derivative) are simple and there exist efficient algorithms for implementation.

In practice, it was found that a polynomial of degree three or less (i.e. of the form $a_0 x^3 + a_1 x^2 + a_2 x + a_3$) can be sufficient for capturing the dynamics of most relationships encountered.

Figure 3:
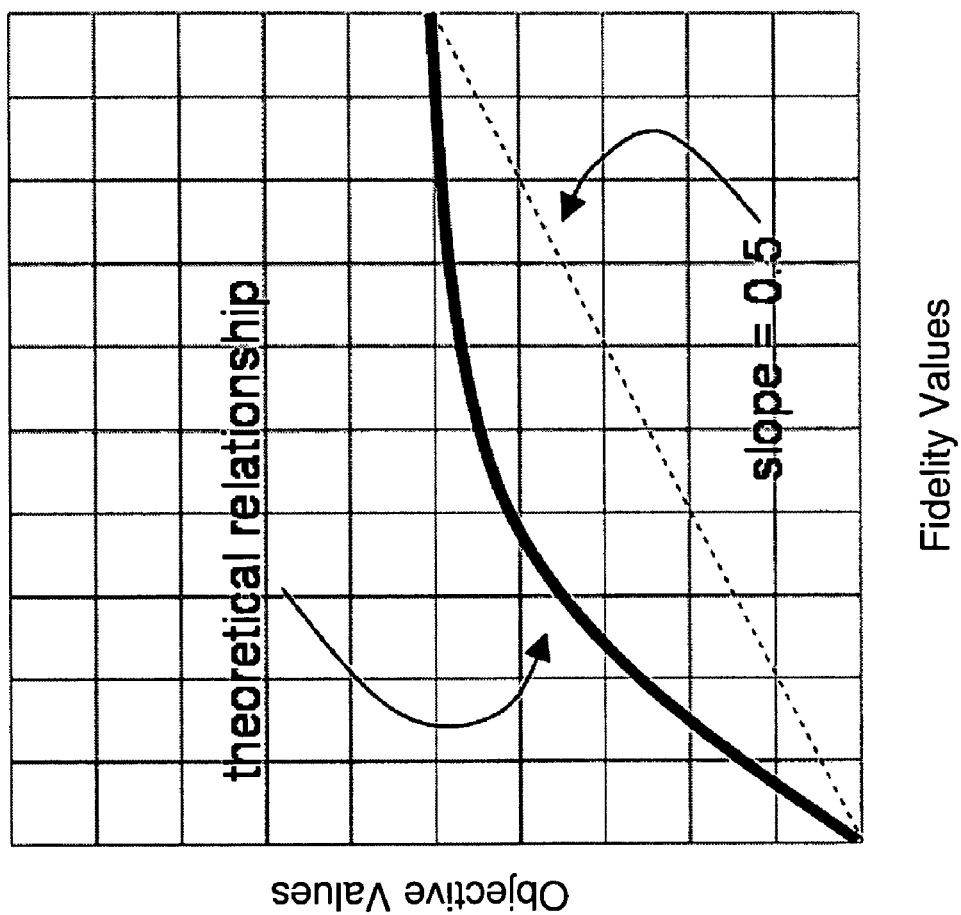
FIG. 3. Shows an example of one embodiment of the theoretical relationship between a fidelity value and an objective value.

The process of creating the polynomial functions begins by examining the theoretical framework developed in step 3. As shown in FIG. 3, each theoretical relationship defines the shape of a curve relating the objective values and the feature values. One axis of the relationship represents a range of fidelity values and the other axis represents a range of objective values. The fidelity values correspond to specific values along the range of possible values for that fidelity dimension. For example, a Visual Scene Display Field of View can range from 0° to a complete 360° filed of view. The other axis of the relationship represents objective values. The objective values correspond to specific values along the range of possible values for that specific objective. As an example, an objective of training a student, or changing their performance on the subject of Interpreting Sensor Output may range from a −100 to a +100 effectiveness. This range represents the ability of this fidelity dimension to either hinder the training of this objective or to be 100% effective in training of that objective. When these values are related in pairs, the resulting curve defines the values of the relationship at its endpoints and the slope of the line connecting the values at the endpoints. In order to maintain consistency among the functions, we use a common scale for the fidelity categories, namely 0-10. The values along this scale are defined in terms of each individual category.

Figure 4:
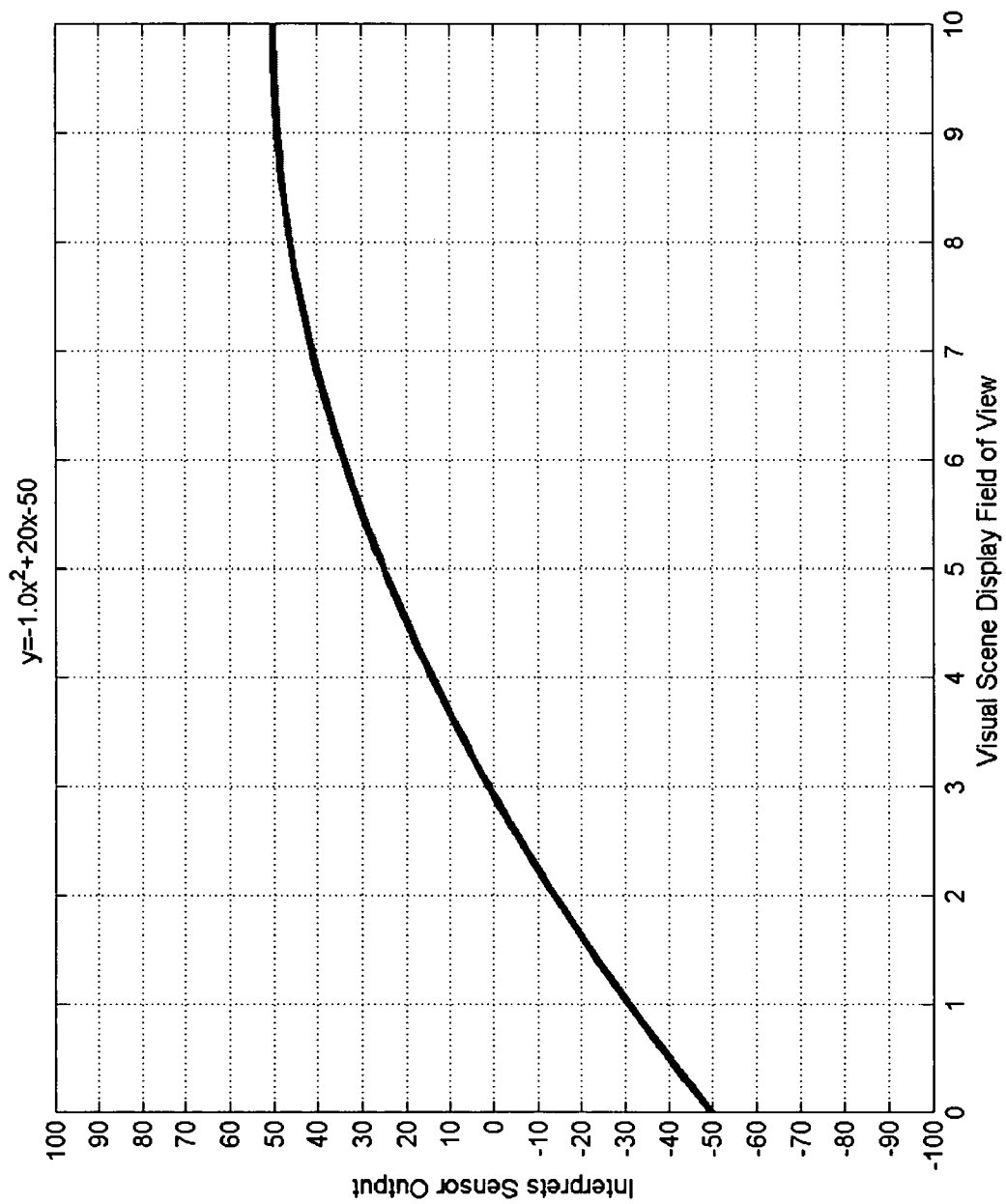
FIG. 4. Shows an example of one embodiment of the results of the mathematical function for one simulator fidelity value and one training objective value.

FIG. 4 shows the example of feature and objective value pairing where Visual Scene Display Field of View has a value of 0 when there is no display and a value of 10 for a complete 360° field of view. Intermediate field of view levels are proportionately assigned values along the scale.

Using this theoretical relationship, a number of points are derived along the curve specific to that fidelity dimension and objective. We first start with the two hypothesized endpoints at 0 and 10. We then use a number of intermediary points to define the shape and slope of the hypothesized relationship. These intermediary points represent fidelity and objective value pairs specifically related to that objective. Using the same example shown in FIG. 4, when the Visual Scene Display Field of View has a fidelity value of 5, reflecting a 180° field of view this may correspond to an objective value of about 25 reflecting a positive impact on the effectiveness in training that objective. When the fidelity value is 3, reflecting about a 108° field of view, this may correspond to an objective value of 0 to the objective signifying that that fidelity value neither increases nor decreases the effectiveness of training that objective. The pairs of fidelity and objective values, representing intermediary points in this mathematical function, can be provided as part of the definition steps in preceding steps 1, 2 and 3, or they can be provided separately.

The functions can be created with a single estimate of the relationship, but it is preferable to create the relationships with at least two pairs of values and more preferable to create the function with three or more pairs of values. Depending on the shape of the curve, we may prefer more or fewer points. For example, a second degree polynomial curve requires three points to derive a function (in general we need one more point than the degree of the polynomial).

Once we have a sufficient number of points to define the function, we can then analyze the relation by performing polynomial interpolation on the points. Interpolation is a method which defines a unique polynomial function passing through a given set of points. The basic algorithm behind interpolation is as follows. Given a set of points (as an example we will use four points to derive a third-degree polynomial) $\{(x_0,y_0), (x_1,y_1), (x_2,y_2), (x_3,y_3)\}$ we construct the following matrices:

$$x = \begin{bmatrix} x_0^3 & x_0^2 & x_0 & 1 \\ x_1^3 & x_1^2 & x_1 & 1 \\ x_2^3 & x_2^2 & x_2 & 1 \\ x_3^3 & x_3^2 & x_3 & 1 \end{bmatrix},$$

$$a = \begin{bmatrix} a_0 \\ a_1 \\ a_2 \\ a_3 \end{bmatrix},$$

$$y = \begin{bmatrix} y_0 \\ y_1 \\ y_2 \\ y_3 \end{bmatrix}$$

We solve for a in the equation $y=Xa$ by finding the inverse of matrix X, $a=X^{-1}y$. The vector a defines the coefficients of the third degree polynomial. The result is a mathematically defined function that can then be used in a model (See FIG. 4).

Figure 6:
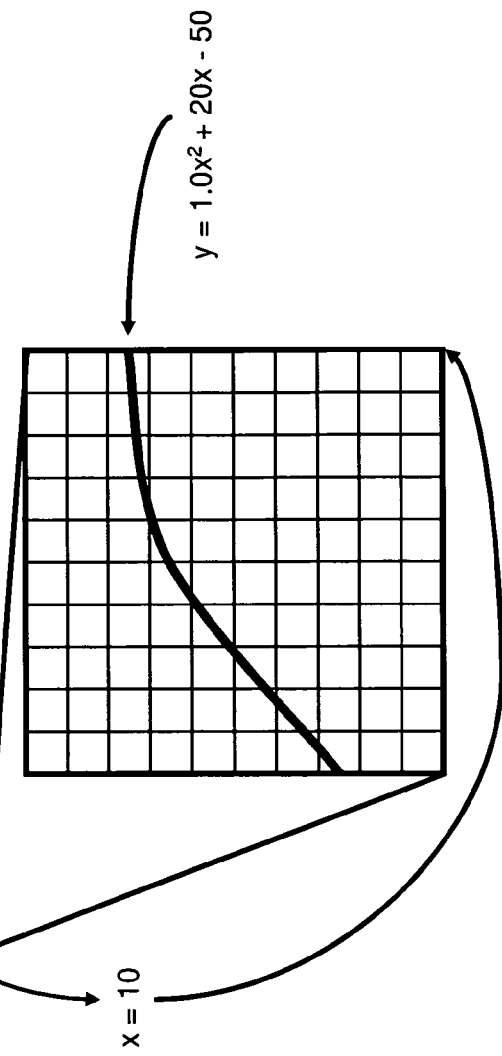
FIG. 6. Illustrates the use of functions to define objective values from fidelity values.

FIG. 6 illustrates how the function relates to the fidelity dimension and objective matching of "Visual Scene of Display Field of View" and "Interprets Sensor Output". As illustrated by the call-out box showing a two-dimensional graph of an x and y axis where the x values represent the fidelity values and the y values represent the objective values. A function, such as that illustrated, can exist for each of the fidelity dimension and objective matchings in the matrix.

It is also contemplated that other embodiments of this process step can include algorithms that inversely map objective values to different fidelity values.

These functions then provide input into the predictive algorithms as described in step 5.

Step 5: Define Predictive Algorithms.

The fifth step 260 in a preferred embodiment of this method is to develop algorithms which combine the individual functions of step 4 together to represent the combined effect of the individual functions, or individual features, given feature values, on the objective.

Using the example of a training simulator, the fidelity values from each of the fidelity dimensions correspond to a specific objective value and when combined, they can be used predict the effectiveness of the training simulator on that objective. With an objective of changing the performance of a student on a subject, the predictive algorithms take as input the levels of fidelity, or fidelity values for each fidelity dimension and provide as output a single objective measure to predict the ability of the level of fidelity inputted to provide a simulator that can change the performance of a student on that subject. The output of the algorithms is the objective measure of the training effectiveness for each training objective.

For embodiments of these systems and methods, we define the objective measure in this embodiment as "anticipated change in performance after training in a simulator with the specified sets of fidelity values."

As illustrated for one objective in FIG. 7, the flow of operation for the algorithms begins by accepting as input the fidelity values 720 (on the scale of 0-10) for each of the fidelity dimensions 710. For each training objective, the mathematical functions 730 which define the relationship between fidelity values and objective values (training effectiveness) are evaluated at the inputted fidelity values. The resulting numbers represent the objective values 740 that are then subjected to the predictive algorithm, which in this embodiment is an average, to generate the objective measure 750 for that training objective.

For example, if we have seven fidelity dimensions and three training objectives then there will be a total of twenty-one functions. The input to the algorithm will be the values for the seven fidelity dimensions, $(x_0, x_1, \ldots, x_6)$. For the first training objective, we evaluate the mathematical functions at their respective fidelity values. The corresponding outputs for each of the seven functions are then averaged to produce the final score for that training objective. This same procedure is repeated for the remaining training objectives, using the appropriate functions.

In general, assuming there are m fidelity dimensions and n training objectives, there will be in all m*n functions to evaluate (i.e. the computational complexity of the algorithm is $O(m*n)$). If new training objectives are added to the model, the computational time will grow linearly with the number of new objectives added (similarly for fidelity dimensions).

It is also contemplated that other embodiments of this process step can include algorithms that combine the scores of multiple training objectives to create a consolidated system measure/score for combined training objectives incorporating multiple fidelity dimensions. This combined score can be used as an additional type of objective to be maximized or minimized. This combination can account for an allocation of weighting of different objectives based on those objectives contribution to a system measure reflective of a system goal.

It is also contemplated that other embodiments of this process step can include algorithms that inversely map the measure of objectives or combined objectives, to different fidelity dimensions and fidelity values. These inverse mappings can be used model systems that may be constrained by certain objectives or objective values.

Step 6: Model Relationships:

The output of steps 4-5 is a model that is capable of relating feature values to objectives and system measures. This model allows step 6 270 which is to model relationships to determine the effect of feature value on the objectives.

For a training simulator system, the model can predict the ability of fidelity values to train specific learning objectives and it can also roll up the results of learning objective into a system objective. Individual fidelity values can be selected, analyzed with the functions of step 4, combined with other function results using the predictive algorithms of step 5 to create an output of an objective measure.

Understanding that the relationship function and predictive algorithms can be pre-defined to accept user input, a computer based tool can be created to model the relationships between fidelity values, objective values and objective measures. For example, once given fidelity values, objective values a computer based model having the relationship functions and predictive algorithms can take the relationship of these values and automatically create objective values and measures. This can allow a user to select and/or iterate through different values and see their effect on other values resulting from the functions and algorithms.

One embodiment of this predictive model would allow a user to input pairs of fidelity and objective values. These values would be used to automatically generate the relationship functions for that fidelity dimension and objective. These resulting relationship functions would automatically be combined with the predictive algorithms to create objective measures where multiple fidelity dimensions were provided. Having been provided a sufficient number of fidelity and objective value pairs, the model has established the relationship functions for each of these fidelity dimensions and objectives and therefore the user can select a different fidelity value and the model will select the corresponding objective value and again automatically create the corresponding objective measure. A model such as this will allow users to iterate through difference fidelity values, objective values or objective measures to determine what mix of values best meet the objective measure. It is also contemplated that a computer based model can be programmed to iterate automatically through every combination of values and select the values that best meet the objective measure.

A computer based model can also be used to help combine different objective measures to create a system measure. As described earlier, this system measure can reflect a weighted combination of the objective measures. Once this system measure is related to the objective measures, it is related to the objective and fidelity values and can also be part of an iteration process to determine different measures based on different values. It is also contemplated that the weightings of each of the objectives may be changed by a user to determine the effect of changing these values.

Step 7: Validate Functions and Algorithms.

Although not required, the seventh and final step 280 in this preferred embodiment is to conduct experiments to validate and/or improve the hypothesized functions and algorithms. The hypothesized functions and algorithms developed during Step 4 and Step 5 are based on broad theories and research related to the impact of simulator fidelity on performance. There is very little training "effectiveness" research looking at the impact of simulator fidelity, so performance data are not available to utilize when developing the functions and algorithms. In step 7, training effectiveness studies are conducted to integrate performance data into the model.

The results of the experiments are then fed back into the model to update the functions. Because there is often not enough experimental data to alone derive mathematical functions, we take a hybrid approach by combining the experimental data points along with the theoretical research. This procedure allows for continuous improvement to the model as new experiments are performed and new theory found.

As shown, the process concludes at the finish 290.

Although the above steps were described in a particular order, none of the particular steps need be performed in the order indicated unless specifically stated. To the contrary, the process may be freely modified by substituting, reordering and/or removing steps as suitable for particular embodiments.

An Operational Description of the System and Method:

For description purposes and not for limitation, one operational embodiment of the method will be described as it is applied to determine the level of fidelity required for effective air-to-air combat training in jet simulators. In this embodiment, the system is a training simulator with a system goal to effectively training jet pilots. In this embodiment, the features are fidelity dimensions for a training simulator and the objectives comprise the training objectives of the simulator. In this embodiment, the fidelity values represent the varying degrees of fidelity considered for that fidelity dimension and objective values represent the effectiveness of that set of fidelity values to meet that training objective.

Other operational embodiments of the systems and methods are contemplated as would be anticipated by one skill in the art.

Step 1: Identify Fidelity Dimensions.

Fidelity dimensions were defined utilizing a global approach towards training simulators in order to (1) develop a framework that will be adaptable to multiple platforms and domains, and (2) to avoid excluding fidelity dimensions that would potentially impact the performance outcomes. For example, F-16 SMEs identified the fidelity dimension of "aircraft alerting sounds" as important to performance on several air-to-air skill objectives. They explained that the alerting sounds provide redundant information to that provided by their cockpit displays and that pilot behavior in the simulator would be different given a lack of alerts. For example, visual scan patterns of pilots may be different in the simulator without aircraft alerting sounds because pilots would need to spend more time looking at displays versus looking outside of the aircraft.

A representative list of fidelity dimensions were identified in this embodiment. FIG. 5 below shows the dimensions of simulator fidelity utilized in this embodiment listed as titles of the columns.

Step 2: Identify Relevant Training Objectives.

In this embodiment, the air-to-air Mission Essential Competencies (MEC$^{SM}$) were used as the training objectives. The air-to-air MECs$^{SM}$ are the competencies, knowledge, and skills that have been identified as necessary for pilots to acquire to be considered mission-ready for air-to-air combat. This embodiment leveraged air-to-air training objectives, and related objective and subjective performance measures, as a means for assessing training effectiveness following the current AFRL/Mesa method The Distributed Mission Operations (DMO) test bed is used to conduct training research with a variety of platforms. One DMO training research area is focused on F-16 pilots in air-to-air combat. The training research consists of a week-long exposure to competency-based scenarios that focus on developing the MEC$^{SM}$ training objectives. Researchers at AFRL/Mesa assess the effectiveness of the DMO training research syllabi by examining the pilots' performance on comparable "benchmark" mission scenarios presented on the first and the last day of training research. The difference in performance from the beginning to the end of the training research week is determined by comparing both the objective and subjective performance data (Symons, France, Bell, and Bennett, 2003).

FIG. 5 shows some example objectives for this embodiment listed as the titles of the rows.

Step 3: Relate Fidelity Dimensions to Training Objectives.

Five F-16 SMEs served as initial respondents to the questionnaire. In addition, four researchers—with expertise in training, cognition/perception, and performance measurement—also completed the questionnaire. The researchers drew upon their related expertise and the relevant theory and research found during the literature reviews. For example, one of the researchers previously examined the effects of field of view (FOV) on pilot performance and was able to utilize those findings in hypothesizing the relationship between FOV and the air-to-air K&S elements.

The results from the questionnaire identified which subsystem changes in fidelity are hypothesized to have an effect on the air-to-air training objectives. For example, nine of the survey respondents—100 percent—identified that changes in communication fidelity would have an impact on performance related to the air-to-air skill "listens." FIG. 5 provides an excerpt from the results of the training objective-to-fidelity questionnaire with the frequency of responses out of nine questionnaires received being shown in each fidelity dimension/objective matrix matching.

During step 3, the researchers also identified variables that affect the relationship between simulator fidelity and training effectiveness. For example, several researchers cite trainee related variables. In addition, several researchers cite task-related variables that potentially affect the relationship between simulator fidelity and training effectiveness, such as the specific knowledge and skills required by the task. As described earlier, it is contemplated that the predictive algorithms can capture and account for these variable's effects in step 5.

Step 4: Define Mathematical Functions.

Using the theoretical relationships derived in step 3, we created the mathematical functions needed for the predictive model. In all there were 11 fidelity dimensions identified and 25 training objectives for a total of 261 possible functions.

The theoretical relationships describe the values at the endpoints (0 and 10) along with the shape of the curve.

For example, the relationship in FIG. 4 has endpoints at (0,−50) and (10, 50). The curve increases asymptotically and levels off near 10. Using the polynomial interpolation methods described earlier, the curve can be approximated with a second degree polynomial. Along with the two endpoints, we identify an additional point along the curve, say (5,25), in order to perform polynomial interpolation. This additional point is identified as a provided pair of fidelity value and objective value. Using this example we construct the three matrices $$X = \begin{bmatrix} 0 & 0 & 1 \\ 100 & 10 & 1 \\ 25 & 5 & 1 \end{bmatrix},$$

$$a = \begin{bmatrix} a_0 \\ a_1 \\ a_2 \end{bmatrix},$$

$$y = \begin{bmatrix} -50 \\ 50 \\ 25 \end{bmatrix}$$

and solve the equation y=Xa for a. The resulting function is $y=-10x^2+20x-50$.

This procedure is repeated for each pair of fidelity dimension and training objective where a relationship was identified to exist.

Step 5: Defining Predictive Algorithms.

In this embodiment that anticipates multiple fidelity dimensions to create multiple objective values, an averaging calculation is used as the predictive algorithm. The averaging calculation takes the sum of the objective values and divides that by the total of values summed.

Step 6: Model Relationships:

Given the results of steps 3-5, a model of the relationships is created. With this model, fidelity values can be selected to generate or create objective values and objective measures.

For example, FIG. 6 illustrates one section of the model as it relates to one objective—"Interprets Sensor Output". As shown, the fidelity values for the fidelity dimensions appear below their respective fidelity dimension (e.g. visual scene display FOV=10, visual scene display resolution=5, etc.). The functions that were mathematically defined in step 4 based on theory, research, and F-16 SME input are shown in the text next to the boxes (e.g. for Visual Scene Display function is $y=-1.0x^2+20x-50$). These functions define the relationship between the fidelity dimension and the objective of air-to-air skill element "intercept procedures". The model runs each fidelity value through its relevant function, as the "x" value, to create the objective values as the "y" value. The model then uses the predictive algorithms to averages these objective values to determine the final objective measure for "intercept procedures". In FIG. 6, the objective measure is the value of 31.5 is calculated as the average of the objective values below their respective function. This objective measure is displayed to the user as the anticipated percent change in performance for that objective after training in a simulator with the specified fidelity values. This process can be repeated to find the anticipated percent change in performance for each training objective.

With this model, iterations of different fidelity values for each fidelity dimension can be made with the resulting objective measures recorded and compared until a maximum measure is obtained.

By combining more than one objective measure, a system measure can be obtained reflecting the systems ability to meet a system goal or objective. One objective may be to maximize the goal. This can be obtained by iterating through different fidelity values. With the system measure, objective measures can also be included in the system measure that can reflect different constraints that should be considered in the system. For example, costs may be added as one objective and the values assigned can be reflective of costs being a constraint on the system.

Step 7: Validate Functions and Algorithms.

An experiment was conducted to examine the training effectiveness differences between pilots flying lower-fidelity Deployable Tactics Trainer (DTT) simulators compared to higher-fidelity Display for Advanced Research and Technology (DART) simulators. The primary differences in fidelity between the two simulators are the visual scene field-of-view and the cockpit controls and displays. Forty-three U.S. Air Force F-16 pilots flew standard training missions as an integrated team of four (a "four-ship") with two pilots flying in the high-fidelity DART simulators and two pilots flying in the lower-fidelity DTT simulators. Various subjective and objective measures were collected to compare the training effectiveness of the two simulators.

In this embodiment, the hypothesis is that the DTT pilots will show less improvement in performance than the DART pilots on certain air-to-air skills from pre- to post-training. Specifically, on the skills of: (1) Maintaining Formation, (2) Executing Merge Gameplan, (3) Radar Mechanization, (4) Switchology, and (5) Interpreting Sensor Output.

The resulting data gathered from the experiments is then fed back into the model to update and improve the functions which define the relationships between fidelity and training outcomes.

To combine the experimental data along with the theoretical relationships identified in step 3, we use an approach which combines genetic algorithms along with linear regression. When the experimental data is sparse, it is difficult to derive accurate representations of the relationships. By supplementing the experimental data points with the theoretical points and shape of the relationship we hope to improve the accuracy of the model.

The basic procedure by which this is done is to perform linear regression on the combined set of experimental data points and theoretical points. To preserve the underlying shape of the relationship, constraints can also be imposed on the slope of the curve at various points. This constraint is achieved by adding a number of additional random points to the regression and performing a genetic search of the space conditioned on the "fitness" of the slope. The resulting function takes into account the experimental data, while still maintaining the previously identified shape of the theoretical relationship.

Although the above descriptions detailed embodiments of the systems and methods associated with training simulators, it is understood that the systems and methods can be utilized for other systems that are able to have one set of attributes affected by the fidelity of the system. As an example, and not as a limitation, the system and methods described can be used to determine the fidelity of computer games to maximize attributes such as score, playing time, and certain acts within the game. Similar embodiments are contemplated such as can be used with performance simulators, non-training simulation environments, financial models, organizational models, product management, testing systems and other simulation systems.

With respect to the above description then, it is to be realized that the optimum relationships for the steps and components of this invention, to include variations in identifying and providing values, analyzing values, relating values and modeling results are deemed readily apparent and obvious to one skilled in the art, and all equivalent relationships to those illustrated in the drawings and described in the specification are intended to be encompassed by the present invention.

Those skilled in the art will appreciate from the foregoing description that the methods and apparatus identified herein may be advantageously modified in an almost limitless number of ways. For instance, one or more of the foregoing techniques may be advantageously performed in isolation or in any desired combination or order. The computer executable code may be configured to be executed on any variety of platforms, such as intranets, wireless networks, and local hard disks by way of non-limiting example. The computer executable code may be executed on one or more computers, host servers or distributed host servers. Furthermore, the computer executable code may be stored on a storage medium, such as read-only-memory (ROM), readable by a general or special purpose programmable computer, for configuring and operating the computer when the storage medium is read by the computer to perform the steps described above. The systems and methods described herein may also be implemented in environments without computer executable code, including "paper and pencil" versions.

We claim:

1. A computer implemented method for measuring an objective of a system, the method comprising the steps of:
   a. receiving an objective;
   b. receiving a feature having a plurality of feature values related to the objective;
   c. analyzing a relationship between the plurality of feature values and the objective to create a plurality of objective values reflecting the ability of the feature values to satisfy the objective;
   d. the relationship between the plurality of feature values and the objective comprises a mathematical function of the plurality of feature values to the plurality of objective values;
   e. selecting a feature value and analyzing the relationship to create an objective value; and
   f. generating an objective measure reflecting the objective value.

2. The method of claim 1 wherein:
   the mathematical function of the plurality of feature values to the plurality of objective values is a polynomial interpolation.

3. The method of claim 2 further comprising receiving the relationship of at least one pairing of the plurality of feature values and the plurality of objective values to create the polynomial interpolation prior to analyzing the polynomial interpolation.

4. The method of claim 2 further comprising receiving the relationship of at least three pairings of the feature value and the objective value to create the polynomial interpolation prior to analyzing the polynomial interpolation.

5. The method of claim 2 wherein:
   the step of receiving a feature comprises receiving a plurality of features each having a plurality of feature values related to the objective;
   the step of selecting at least one feature value comprises selecting at least one feature value from each feature and analyzing the polynomial interpolation to create at least one objective value for each feature; and
   the objective measure reflects a combination of the objective values for each feature.

6. The method of claim 5 further comprising:
   a first objective measure reflecting a first set of feature values for each feature;
   a second objective measure reflecting a second set of features values for each feature; and
   comparing the first and second objective measure.

7. The method of claim 5 further comprising:
   receiving a system goal;
   receiving a plurality of objectives each objective related to each plurality of features and each objective having a weighted value to the objective goal;

selecting at least one feature value and analyzing the relationship to create at least one objective value for each objective;

generating an objective measure for each of plurality of objectives; and generating a system goal measure reflecting a combination of the objective measures and the objective value.

8. The method of claim 7 further comprising generating a system goal measure optimum by selecting a plurality of feature values that result in the system goal measure closest to the system goal.

9. The method of claim 7 further comprising generating a system goal measure optimum feature list by identifying the plurality of feature values that result in the system goal measure optimum.

10. The method of claim 1 wherein the feature comprises a fidelity dimension.

11. The method of claim 1 wherein the feature values are values of fidelity in a processor based aircraft simulator.

12. A method for relating the features of a system to objectives of a system, said method comprising:

identifying at least one feature;

each feature comprises at least one feature value;

identifying at least one objective;

each objective comprises at least one objective value and each objective value is related to a feature value;

defining a functional relationship that relates the at least one feature to the at least one objective to create the at least one objective value;

the functional relationship is a computer implemented polynomial interpolation of at least one objective value and the feature value;

defining a predictive relationship that relates the at least one objective value to create an objective measure;

the predictive relationship is a computer implemented average of the at least one objective value; and the at least one feature is at least one fidelity dimension.

13. The method of claim 12 wherein the at least one feature is at least one fidelity dimension of a training simulator.

14. The method of claim 13 wherein the at least one objective is at least one training objective of a training simulator.

* * * * *